(12) United States Patent
Kim

(10) Patent No.: US 9,880,648 B2
(45) Date of Patent: Jan. 30, 2018

(54) TOUCH PAD INPUT DEVICE

(71) Applicant: ITVERS CO., LTD., Seoul (KR)

(72) Inventor: Youn Soo Kim, Seoul (KR)

(73) Assignee: ITVERS CO., LTD., Seoul (KR)

( * ) Notice: Subject to any disclaimer, the term of this patent is extended or adjusted under 35 U.S.C. 154(b) by 0 days.

(21) Appl. No.: 14/443,991

(22) PCT Filed: Nov. 15, 2013

(86) PCT No.: PCT/KR2013/010421
§ 371 (c)(1),
(2) Date: May 19, 2015

(87) PCT Pub. No.: WO2014/077630
PCT Pub. Date: May 22, 2014

(65) Prior Publication Data
US 2015/0286302 A1     Oct. 8, 2015

(30) Foreign Application Priority Data

Nov. 19, 2012  (KR) .......................... 10-2012-0130746

(51) Int. Cl.
*G06F 3/041*    (2006.01)
*H01H 13/705*  (2006.01)
(Continued)

(52) U.S. Cl.
CPC .......... *G06F 3/041* (2013.01); *G06F 3/03547* (2013.01); *G06F 3/0488* (2013.01);
(Continued)

(58) Field of Classification Search
CPC ........................... G06F 3/03547; G06F 3/0414
See application file for complete search history.

(56) References Cited

U.S. PATENT DOCUMENTS

2007/0052691 A1*  3/2007  Zadesky ............... G06F 3/0338
                                                        345/173

FOREIGN PATENT DOCUMENTS

JP         09-251347 A      9/1997
KR  10-2002-0090448 A     12/2002
(Continued)

OTHER PUBLICATIONS

International Search Report dated Feb. 24, 2014 of PCT/KR2013/010421 which is the parent application and its English translation—5 pages.

(Continued)

*Primary Examiner* — Gerald Johnson
(74) *Attorney, Agent, or Firm* — Knobbe Martens Olson & Bear LLP

(57) ABSTRACT

A touch pad input device includes a touch pad having a touch area formed on an upper surface thereof; a switch installed under the touch pad to generate a signal when a downward external force more than a reference value is applied; a restoring means configured to support elastically upward a lower surface of the touch pad; and a housing in which the touch pad, the switch and the restoring means are installed. Even when only one switch is installed under the touch pad, the switch can be stably operated when each area of the touch pad is pushed, and since the separate printed circuit board for transmitting the pushing signal of the switch is omitted, it is possible to provide a simple internal structure and to reduce a manufacturing cost, and all functions of a mouse and an arrow key can be performed.

17 Claims, 14 Drawing Sheets

(51) Int. Cl.
*G06F 3/0354* (2013.01)
*G06F 3/0488* (2013.01)
*H01H 3/02* (2006.01)

(52) U.S. Cl.
CPC ....... *G06F 3/04886* (2013.01); *H01H 13/705* (2013.01); *H01H 2003/0293* (2013.01); *H01H 2225/002* (2013.01); *H01H 2239/014* (2013.01); *H01H 2239/074* (2013.01)

(56) References Cited

FOREIGN PATENT DOCUMENTS

KR  10-2007-0077314 A  7/2007
KR  10-2011-0009478 A  1/2011

OTHER PUBLICATIONS

Office Action dated Feb. 25, 2014 of corresponding Korean Application No. 10-2012-0130746—5 pages.
Notice of Allowance dated Aug. 21, 2014 of corresponding Korean Application No. 10-2012-0130746—2 pages.

* cited by examiner

TOUCH PAD INPUT DEVICE

TECHNICAL FIELD

The present invention relates to an input device which is capable of inputting various kinds of signals using a touch pad, and more particularly, to a touch pad input device which is configured to drag and input a signal on a touch pad and also to press down the touch pad to operate a switch provided under the touch pad.

BACKGROUND ART

Recently, as various remote controllable electronic products such as a smart computer and an Internet protocol television (IPTV) appear, various kinds of signal input devices for remotely inputting a signal into the electronic products are also provided. Meanwhile, an input method in which a corresponding item or icon is selected by moving a mouse cursor and a menu is executed is used widely, and thus a remote controller in which a touch pad is installed to move the mouse cursor is being commercialized.

When the mouse cursor is operated using the touch pad, the mouse cursor is located on the corresponding item or icon, and the corresponding item or icon is selected by tapping the touch pad. Here, when a user unintentionally touches the touch pad, an undesired item or icon may be selected. Also, when a user's finger is slightly separated from and then in contact with the touch pad during a drag motion, an item or icon selection may be undesirably executed. Further, there has been proposed a remote controller in which a mouse movement is performed through the touch pad, and the item and icon selection is performed through a separate button. However, in this case, there is a difficult in alternatively operating the touch pad and the button with one finger.

To solve the problems, there has been proposed a signal input device in which a switch is installed at a lower side of the touch pad. Hereinafter, the signal input device having the touch pad and the switch will be described in detail with reference to the accompanying drawings.

FIG. 1 is an exploded perspective view of a conventional signal input device, and FIG. 2 is a side view of the conventional signal input device.

As illustrated in FIGS. 1 and 2, the conventional signal input device is configured so that a printed circuit board 20 is located under a touch pad 10, and switches 30 are installed on the printed circuit board 20, and the touch pad 10, the printed circuit board 20 and the switches 30 are mounted in one housing 40. A user performs a drag operation on the touch pad 10 to move a mouse cursor and then presses down the touch pad 10 so that a pushing terminal 32 of the switch 30 is pushed, and thus a signal input such as an item or icon selection may be performed.

At this time, the switches 30 are located in an up and down direction and a left and right direction centering on a center portion of the touch pad 10, and thus a kind of the operated switch 30 is determined according to an area of the touch pad 10 pushed by the user. However, when a plurality of switches 30 are provided under one touch pad 10, several switches 30 may be pushed at a time, and thus a malfunction may occur, and also since a constant click feeling may not be provided, the user may fall in confusion. Also, to operate the switch 30 even when the user pushes any area of the touch pad 10, the plurality of switches 30 should be provided under the touch pad 10, and thus a manufacturing cost may be increased.

Besides, to transmit a pushing signal of the switch 30, the separate printed circuit board 20 other than the touch pad 10 is necessarily required, and thus a structure is complicated, and a manufacturing cost is remarkably increased.

DISCLOSURE

Technical Problem

The present invention is directed to providing a touch pad input device in which only one switch is installed under a touch pad, and the switch is stably operated even when any area of the touch pad is pushed, and a separate printed circuit board for transmitting a pushing signal of the switch is omitted, thereby providing a simple internal structure and reducing a manufacturing cost.

Technical Solution

One aspect of the present invention provides a touch pad input device including: a touch pad having a touch area formed on an upper surface thereof; a switch installed under the touch pad to generate a signal when a downward external force more than a reference value is applied; a restoring means configured to support elastically upward a lower surface of the touch pad; and a housing in which the touch pad, the switch and the restoring means are installed.

The restoring means may include three or more supporting parts which are disposed to be spaced a predetermined distance or more from a center portion of the touch pad, and of which lower ends are seated on a bottom surface of the housing, and upper ends support the lower surface of the touch pad.

The supporting parts may be radially disposed centering on the center portion of the touch pad.

The supporting parts may have a pillar or wall shape.

The touch pad may have a touch area formed at a center portion of an upper surface thereof, and the supporting parts may support a portion of the lower surface of the touch pad which is located at an outer side than a portion corresponding to the touch area.

The touch pad may be formed in a quadrangular plate shape, the touch area may be formed in a circular shape, and the supporting parts may be disposed to support each corner portion of the touch pad.

An insertion groove in which a lower end of each of the supporting parts is inserted may be formed at the bottom surface of the housing.

The restoring means may further include a seating part which is connected with the plurality of supporting parts so that the touch pad is seated thereon, and in which a through-hole is formed at a portion thereof corresponding to the switch.

Upper surfaces of the supporting parts may be disposed to be lower than an upper surface of the seating part.

The supporting parts and the seating part may be connected through an elastic piece, and the elastic piece may be disposed so that a portion thereof connected with the supporting parts is lower than a portion thereof connected with the seating part.

A fixing end configured to protrude upward so as to be in contact with an external side end of the touch pad may be formed at all or a part of an edge of the seating part.

The touch pad may have at least one of a connector and an extending piece which extend horizontally from an external side end thereof, and the fixing end may be in close contact with left and right ends of the connector or the extending piece.

One switch may be installed at a center portion of the lower surface of the touch pad.

The switch may be installed at the lower surface of the touch pad so that a pushing terminal is directed downward.

The housing may have a protruding part formed at a portion thereof, which is in contact with the pushing terminal of the switch, so as to protrude upward.

Another aspect of the present invention provides a touch pad input device including: a touch pad; a switch installed at a lower surface of the touch pad so that a pushing terminal is directed downward; and a housing in which the touch pad and the switch are installed and the pushing terminal is pressed on a bottom surface thereof when a downward external force more than a reference value is applied to the touch pad.

A signal transmitting circuit of the switch may be integrated with an integrated circuit formed at the lower surface of the touch pad.

The housing may have a protruding part formed at a portion thereof, which is in contact with the pushing terminal of the switch, so as to protrude upward.

The touch pad may be moved down regardless of a position of the downward external force applied to the touch pad.

The touch pad input device may further include a cover coupled to the housing so as to cover the touch pad and having an opening so that the touch area is exposed to an outside.

The touch area may protrude so as to be inserted into the opening.

When a pressure more than the reference value is applied to the touch pad so as to turn on the switch, and the pressure applied to the touch pad is reduced to be less than the reference value and thus to turn off the switch, and then a drag operation is performed while a touched state is maintained, a drag function of drag and drop functions may be realized.

While the drag function of the drag and drop functions is realized, when the pressure more than the reference value is applied again to the touch pad and thus the switch is turned on, a pointer may be continuously moved, even though the drag operation is not performed, or a pointer moving speed may be changed.

While the drag function of the drag and drop functions is realized, when a contact means which is performing the drag operation is separated from the touch pad, or when the contact means which is performing the drag operation is separated from the touch pad and then tapped once or more times on the touch pad, or when the contact means which is performing the drag function is separated from the touch pad and then pressed on the touch pad, and the switch is turned on once or more times, a drop function of the drag and drop functions may be realized.

While a pressure more than the reference value is applied to the touch pad, and thus the switch is turned on, when the drag operation is performed, a drag function of the drag and drop functions may be realized.

While the switch is turn on, when a pressure less than the reference value is applied to the touch pad while realizing the drag function, and the switch is turned off, and a pressure more than the reference value is applied again, and the switch is turned on, a pointer may be continuously moved, even though the drag operation is not performed, or a pointer moving speed may be changed.

While the drag function of the drag and drop functions is realized, when a contact means which is performing the drag operation is separated from the touch pad, when the contact means which is performing the drag operation is separated from the touch pad and then tapped once or more times on the touch pad, or when the contact means which is performing the drag function is separated from the touch pad and then pressed on the touch pad, and the switch is turned on once or more times, the drop function of the drag and drop functions may be realized.

When a pressure less than the reference value is applied once or more times to the touch pad, and then the drag operation is performed, a drag function of the drag and drop functions may be realized.

While the drag function is realized in a state in which the switch is turned off, when a pressure more than the reference value is applied and the switch is turned on, a pointer is continuously moved, even though the drag operation may not be performed, or a pointer moving speed may be changed.

While the drag function of the drag and drop functions is realized, when a contact means which is performing the drag operation is separated from the touch pad, when the contact means which is performing the drag operation is separated from the touch pad and then tapped once or more times on the touch pad, or when the contact means which is performing the drag function is separated from the touch pad and then pressed on the touch pad, and the switch is turned on once or more times, a drop function of the drag and drop functions may be realized.

When a pressure more than the reference value is applied to the touch pad, and the switch is turned on, a pointer moving signal may be continuously generated.

The pointer may be moved from the center portion of the touch pad toward a position in which the pressure is applied so as to turn on the switch.

The pointer may be moved from a position in which the touch pad is initially touched toward a position in which the pressure is applied so as to turn on the switch.

The pointer may be moved in a linear direction following a drag direction just before the pressure is applied so as to turn on the switch.

When the pressure is applied so as to turn on the switch, and then released within a predetermined period of time, an execution signal may be generated, and when a state in which the pressure is applied so as to turn on the switch exceeds the predetermined period of time, a pointer moving signal may be generated.

When a pressure less than the reference value is continuously applied once or predetermined times or more to the touch pad, the touch pad input device may be converted into a scroll signal input mode.

When the drag signal forms an arc shape in a clockwise direction, a screen scroll may be realized at one side, and when the drag signal forms an arc shape in a counterclockwise direction, the screen scroll may be realized at the other side.

When a pressure less than the reference value is continuously applied once or predetermined times or more to the touch pad, the touch pad input device may be converted into an arrow key signal input mode.

When the drag signal is input in the arrow key signal input mode, the screen scroll may be realized.

When a linear drag signal is input in the arrow key signal input mode, the screen scroll is realized, and when a curved or arc-shaped drag signal is input in the arrow key signal input mode, the touch pad input device may be converted into a pointer moving signal input mode.

The touch area of the touch pad may be divided into four partial areas so as to generate an arrow key input signal, or divided into five or more partial areas so as to generate the arrow key input signals of four areas and a selection signal of one area.

The touch area of the touch pad may be divided into four or more partial areas, and when a drag signal is applied in the arrow key signal input mode so as to pass through three or more partial areas, the touch pad input device may be returned to the pointer moving signal input mode.

While the switch is turned off, when the touch pad is touched for a predetermined period of time, an arrow key signal may be continuously generated.

A generating speed of the arrow key signal may be changed according to a time interval when a pressure less than the reference value is continuously applied twice or more.

When the touch pad is touched for a predetermined period of time in a state in which the switch is turned on, the generating speed of the arrow key signal may be changed.

When a pressure more than the reference value is continuously applied predetermined times or more to the touch pad, the touch pad input device may be converted into a scroll signal input mode.

When a pressure more than the reference value is applied for a predetermined period of time or more to the touch pad, the touch pad input device may be converted into a scroll signal input mode.

Advantageous Effects

According to the touch pad input device of the present invention, even though only one switch is installed under the touch pad, the switch can be stably operated when each area of the touch pad is pushed, and since the separate printed circuit board for transmitting the pushing signal of the switch is omitted, it is possible to provide a simple internal structure and to reduce a manufacturing cost, and all functions of a mouse and an arrow key can be realized.

EMBODIMENTS OF THE INVENTION

Hereinafter, a touch pad input device according to embodiments of the present invention will be described in detail with reference to the accompanying drawings.

Figure 3:
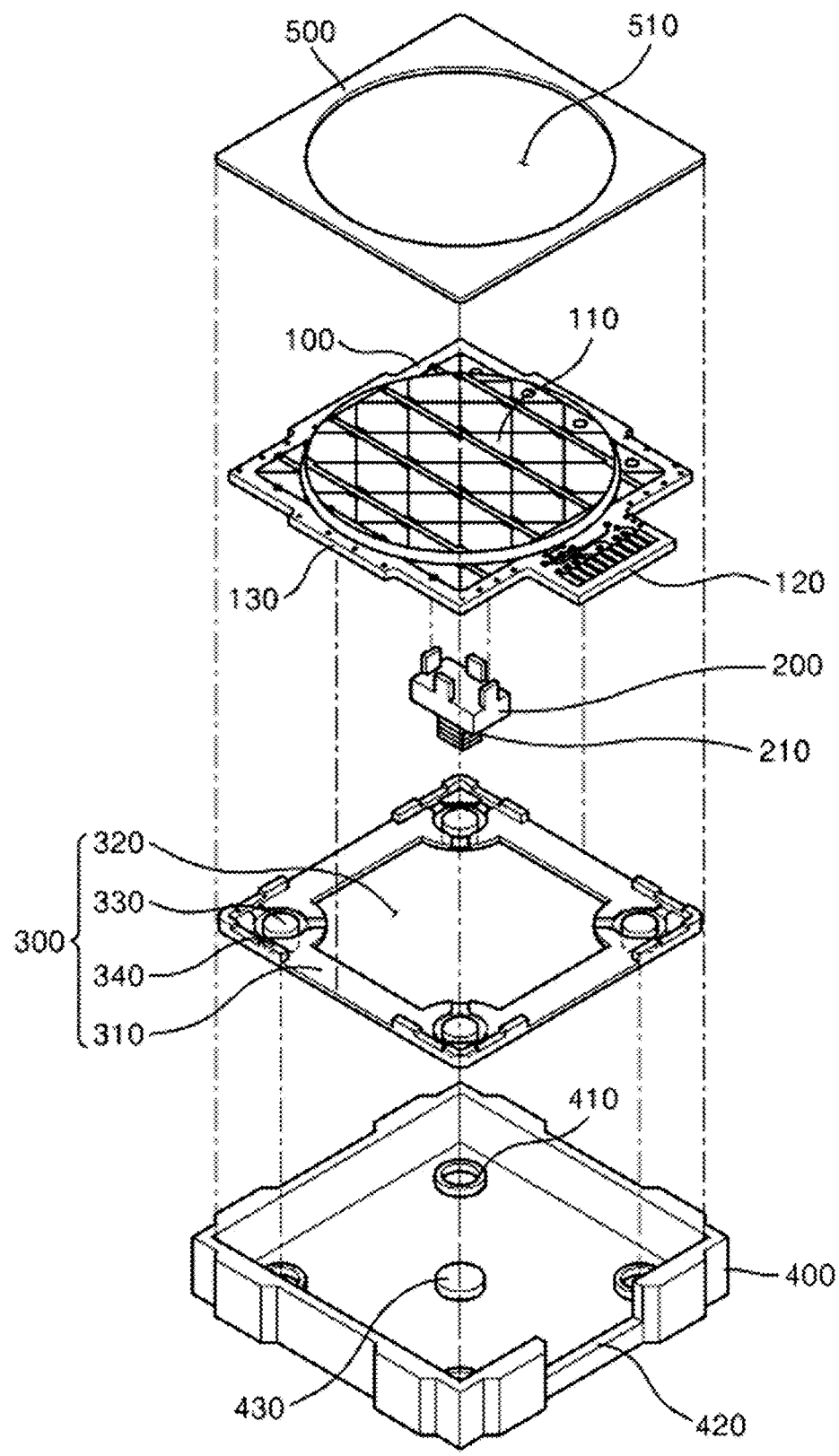
FIG. 3 is an exploded perspective view of a touch pad input device according to the present invention.
Figure 4:
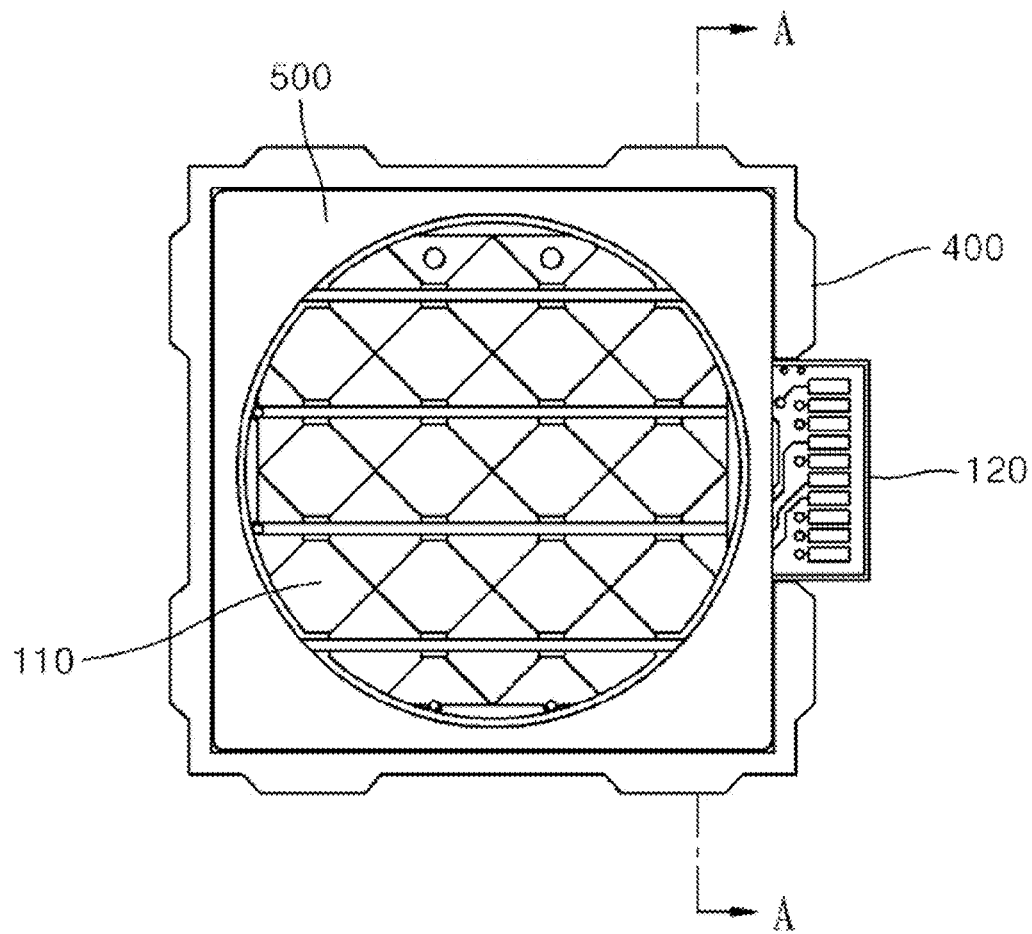
FIG. 4 is a plan view of the touch pad input device according to the present invention.
Figure 5:
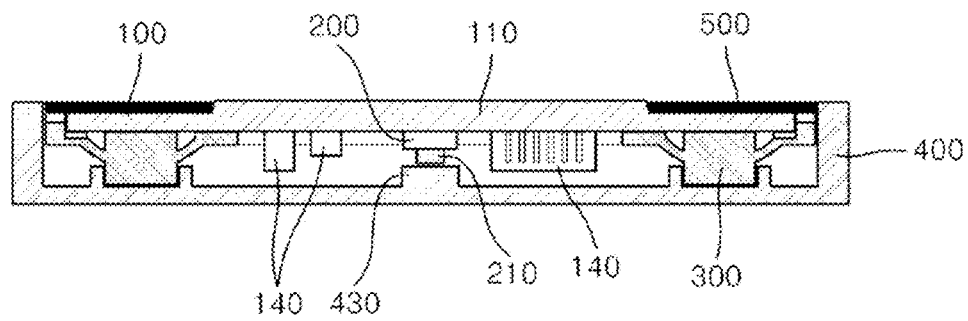
FIG. 5 is a cross-sectional view of the touch pad input device according to the present invention.

FIG. 3 is an exploded perspective view of a touch pad input device according to the present invention, FIG. 4 is a plan view of the touch pad input device according to the present invention, and FIG. 5 is a cross-sectional view of the touch pad input device according to the present invention.

The touch pad input device according to the present invention is kind of a signal input device including a touch pad 100 for inputting a drag signal, and a switch as a signal input means for inputting a pressing signal. As illustrated in FIGS. 3 to 5, the touch pad input device according to the present invention includes the touch pad 100 having a touch area 110 formed on an upper surface thereof, the switch installed at a lower surface of the touch pad 100, a housing 400 in which the touch pad 100 and the switch are mounted, and a cover coupled to an upper end of the housing 400 so as to cover the touch pad 100 and thus to prevent the touch pad 100 from being separated from the housing 400.

Figure 1:
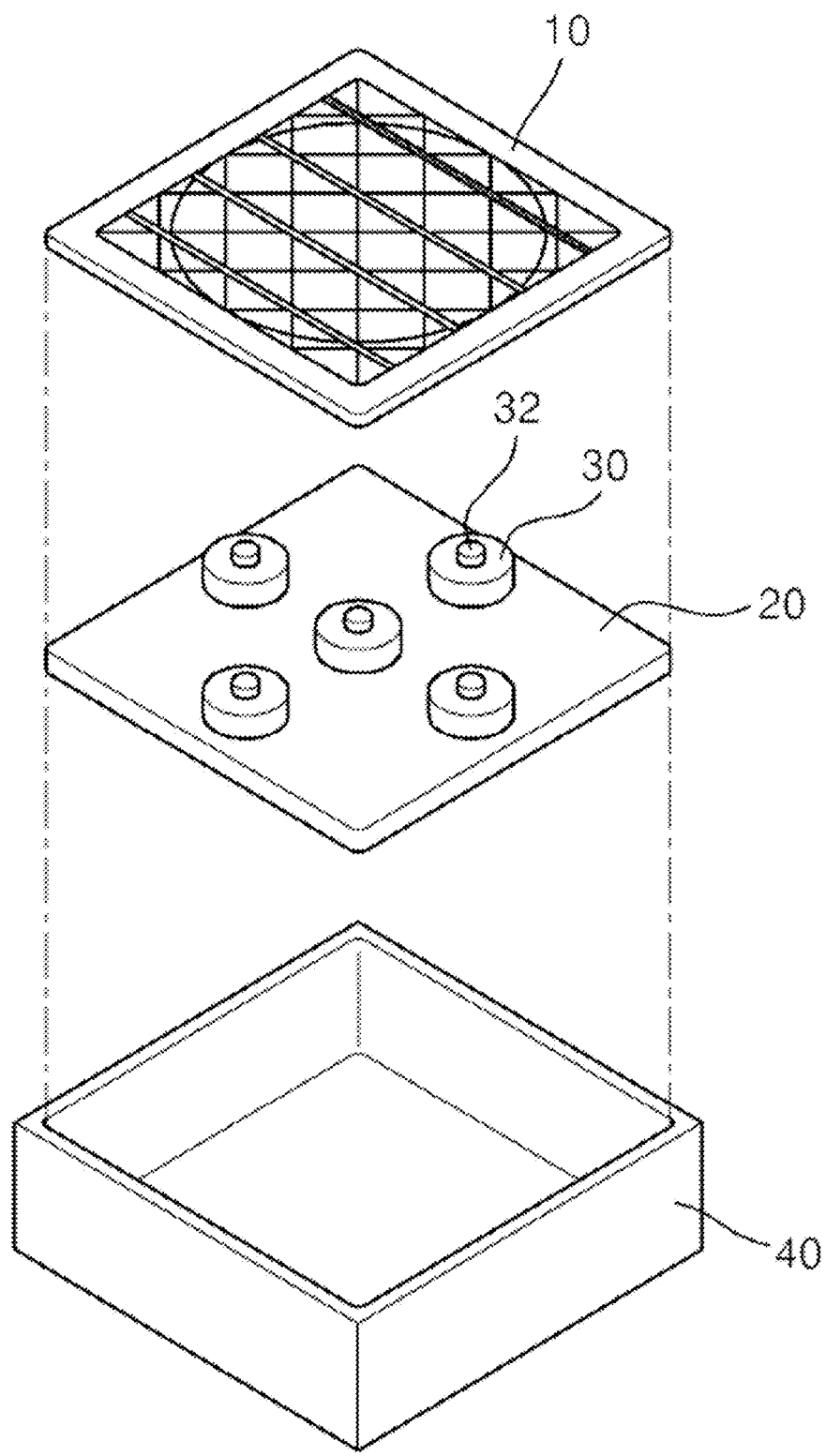
FIGS. 1 and 2 are an exploded view and a side view of a conventional signal input device.
Figure 2:
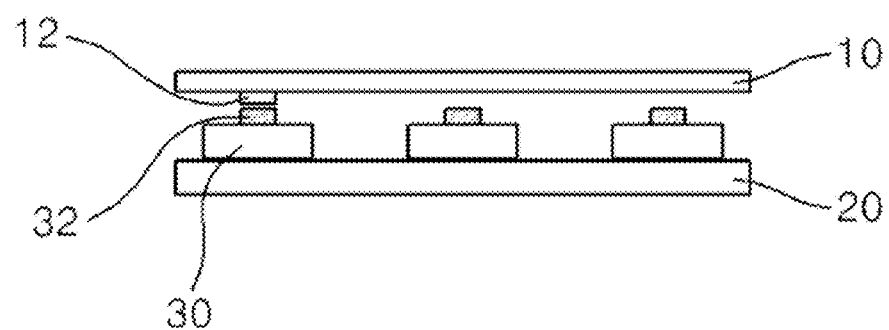

At this time, the touch pad input device according to the present invention is characterized in that the switch is not installed at a separate printed circuit board, but is installed at the lower surface of the touch pad 100 so that a pushing terminal provided at the switch is directed downward, and when a downward external force more than a reference value is applied to the touch pad 100, the pushing terminal is pressed on a bottom surface of the housing 400 and is in an ON state in which a signal is generated. The conventional signal input device illustrated in FIGS. 1 and 2 is configured so that the pushing terminal 32 of the switch 30 is pressed on the lower surface of the touch pad 10 and thus the switch 30 is in the ON state. Typically, since an integrated circuit (IC) including various circuits and circuit components are mounted on the lower surface of the touch pad 10, the IC may be damaged by pressing the pushing terminal 32. However, in the touch pad input device according to the present invention, since the pushing terminal of the switch is pressed on the bottom surface of the housing 400, instead of the touch pad 100, the above-described damage of the IC does not occur.

Meanwhile, when the switch is installed at the lower surface of the touch pad 100, a signal transmitting circuit of the switch may be integrated with the IC formed at the lower surface of the touch pad 100, and thus the separate printed circuit board for transmitting a signal of the switch may be omitted. As described above, when the printed circuit board may be omitted, a thickness of a product may be smaller, and thus the product may be slimmer, and a manufacturing cost may be reduced, and an assembling process may be also simplified, compared with the conventional signal input device illustrated in FIGS. 1 and 2.

Also, in the case in which heights of the circuit components installed at the lower surface of the touch pad 100 are similar to a height of the switch, when the touch pad 100 is pressed down so that the pushing terminal is in contact with the bottom surface of the housing 400, the circuit components may be also in contact with the bottom surface of the housing 400 and thus may be damaged. Therefore, the housing 400 may have a protruding part 430 formed at a portion thereof, which is in contact with the pushing terminal of the switch, so as to protrude upward, and thus the pushing terminal may be pushed before the circuit components are in contact with the bottom surface of the housing 400. A shape and a size of the protruding part 430 may be changed according to specifications of the switch, and detailed description thereof will be omitted.

Meanwhile, in the touch pad input device according to the present invention, two or more switches may be provided under the touch pad 100, and also only one switch may be provided at a center portion of the touch pad 100, like in the embodiment. In the case in which only one switch is provided as described above, when a user presses down the center portion of the touch pad 100, the switch may be normally pushed, but when the user presses down an edge portion of the touch pad 100, the touch pad 100 may be inclined, and thus the switch may not be normally pushed. Of course, when the touch pad 100 is manufactured to be inserted into the housing 400 in a fitting manner, the touch pad 100 may be prevented from being inclined. However, in this case, a high intensity of frictional force may be generated between the touch pad 100 and the housing 400, and a lot of force is required to press down the touch pad 100.

To solve the problem, the touch pad input device is characterized to have a structure in which the touch pad 100 is not inclined to one side, even when the downward external force is applied to any point on the upper surface of the touch pad 100, i.e., a structure in which all of the touch pad 100 is moved down. The touch pad input device according to the present invention may further include a restoring means 300 which elastically and upward supports the lower surface of the touch pad 100 so that the touch pad 100 is not inclined to one side and is wholly moved down. At this time, the restoring means 300 includes a supporting part 330 which supports the lower surface of the touch pad 100. If the supporting part 330 is installed at only the center portion of the touch pad 100, or only left and right sides of the touch pad 100, the touch pad 100 may not be prevented from being inclined. Therefore, it is preferable that three or more supporting parts 330 be disposed to be spaced a preset distance or more from the center portion of the touch pad 100. The embodiment illustrates the case in which the touch pad 100 is formed in a quadrangular shape, and total 4 supporting parts 330 are provided at corner portions of the touch pad 100, respectively. However, the number of the supporting parts 330 may be changed into three or four or more, as long as the touch pad 100 may be stably supported. Furthermore, it is preferable that the supporting parts 330 be radially arranged centering on the center portion of the touch pad 100 so as to support more stably the touch pad 100. Also, the embodiment illustrates only the case in which the supporting part 330 is formed in a pillar shape. However, the shape of the supporting part 330 is not limited thereto, but may be changed to have various shapes. For example, the supporting part 330 may be formed in a wall shape to support an edge portion of the lower surface of the touch pad 100. Further, the embodiment illustrates the case in which the supporting part 330 is formed of an elastic material such as silicone. However, the supporting part 330 may be replaced with another element having structural elasticity such as a spring.

As described above, when the touch pad 100 is elastically supported by a plurality of supporting parts 330, the touch pad 100 may be prevented from being inclined to one side. Therefore, when the downward external force is applied to the touch pad 100, the switch may be stably pushed. Also, when the downward external force applied to the touch pad 100 is released, the touch pad 100 is automatically restored to its original status by the elasticity of the restoring means 300, and thus a click feeling generated when the switch is pushed may be constantly provided.

Meanwhile, an insertion groove 410 in which a lower end of the supporting part 330 is inserted is formed at the bottom surface of the housing 400 so as to prevent the supporting part 330 from being inclined and falling down to one side when the touch pad 100 is pressed down. As described above, in the case in which the lower end of the supporting part 330 is inserted into the insertion groove 410 when the restoring means 300 is seated on an inside of the housing 400, the supporting part 330 may be prevented from falling down when the touch pad 100 is pressed, and also an operation in which the supporting part 330 is seated on a normal position during an assembling process may be easily performed. In particular, when the housing is formed of a transparent material, it is possible to visually check whether the supporting part 330 is normally seated through a lower surface of the housing 400 even after the assembling process is completed, and thus an assembly inspection of the product may be easily performed.

Also, if the plurality of supporting parts 330 are provided in a separated state, it is difficult to perform the operation in which the supporting parts 330 are seated at the housing 400, and also there is a limitation in stably supporting the touch pad 100. Therefore, to solve the problems, the restoring means 300 may further include a seating part 310 which is configured to connect the plurality of supporting parts 330 and on which the touch pad 100 is seated. Of course, if the seating part 310 is formed to cover the entire lower surface of the touch pad 100, the switch is interfered with the seating part 310, and a normal operation may not be performed. Therefore, a through hole 320 through which the switch passes should be provided at an area of the seating part 310 at which the switch is installed. As described above, when the plurality of supporting parts 330 are connected with each other by the seating part 310, there is no risk that the supporting parts 330 may fall down, and the assembling process in which the restoring means 300 is seated at the housing 400 may be easily performed, and the touch pad 100 may be more stably supported.

Meanwhile, when the restoring means 300 is configured to support only the lower surface of the touch pad 100, the touch pad 100 seated on the seating part 310 may be moved horizontally. Therefore, a fixing end 340 which protrudes upward so as to be in contact with an external side end of the touch pad 100 may be formed at an edge of the seating part 310. The embodiment illustrates only a structure in which the fixing end 340 is provided at only each corner portion of the edge of the seating part 310. However, the fixing end 340 may be formed at another portion of the edge of the seating part 310, or may be formed at the entire edge of the seating part 310. At this time, when the fixing end 340 is formed to be excessively high, the cover may not be in contact with the upper surface of the touch pad 100, and thus it is preferable that a height of the fixing end 340 be set to be less than a thickness of the touch pad 100.

Further, when the touch pad 100 is manufactured, a plurality of touch pads 100 are designed on one large-sized substrate, and the designed substrate is cut, and thus the plurality of touch pads 100 are produced at a time. At this time, a cutting operation is performed at an extending piece 130 which extends laterally, and thus the extending piece 130 which extends horizontally may be provided at each touch pad 100. Also, a connector 120 for transmitting and receiving the signal of the touch pad 100 to/from an outside is formed to extend laterally. Like this, when at least one of the connector 120 and the extending piece 130 is provided at the touch pad 100, the fixing end 340 is not formed at the entire edge of the seating part 310, but may be formed at only a portion thereof which does not correspond to the connector 120 or the extending piece 130 so as to be in close contact with left and right ends of the connector 120 or the extending piece 130. Further, the connector 120 extends to an outside of the housing 400, and thus a latching groove 420 through which the connector 120 passes should be formed at a portion of a side wall of the housing 400 corresponding to the connector 120. Like this, when the fixing end 340 is configured to be in close contact with left and right sides of the connector 120 or the extending piece 130, the touch pad 100 is completely prevented from being moved horizontally.

Also, when the cover installed to cover the touch pad 100 is configured to cover the entire upper surface of the touch pad 100, the touch area 110 is not exposed to an outside, and thus the cover has an opening through which the touch area 110 is exposed to the outside. At this time, when the touch area 110 is lower than an upper surface of the cover, i.e., the touch area 110 has a low stepped structure, the touch feeling is severely deteriorated, and thus it is preferable that the touch area 110 be formed to protrude and to be inserted into the opening. That is, an upper surface of the touch area 110 may be formed to have a height coinciding with the upper surface of the cover, or may be formed to be higher than the upper surface of the cover, as illustrated in FIG. 5.

Figure 6:
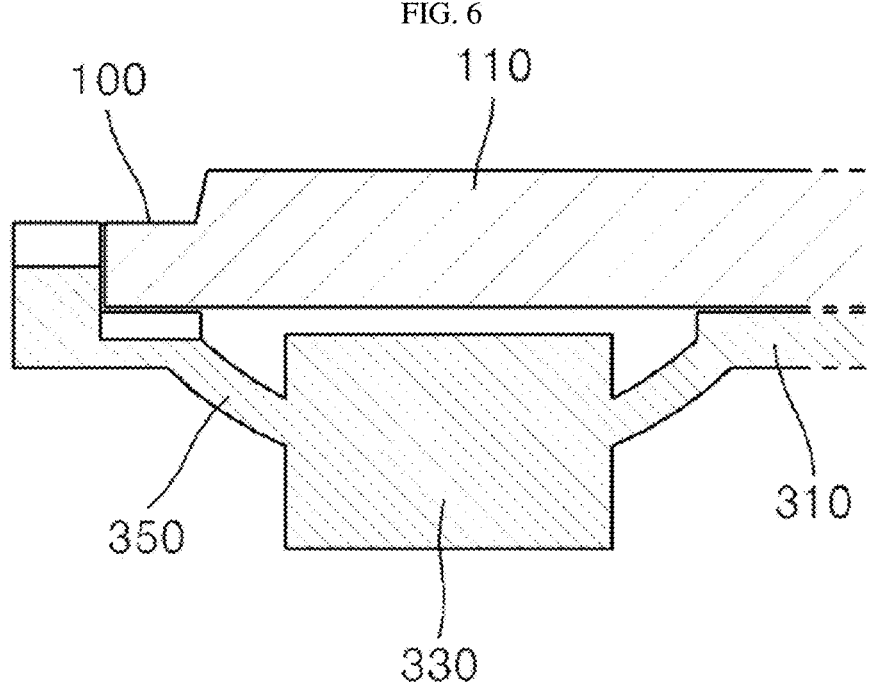
FIG. 6 is a partial cross-sectional view of the touch pad input device according to the present invention.

FIG. 6 is a partial cross-sectional view of the touch pad input device according to the present invention.

In order for the switch to be turned on when the downward external force is applied to the touch pad 100, the touch pad 100 should be moved down by a pushed distance of the pushing terminal. At this time, if the supporting part 330 is configured so that an upper surface thereof is in contact with the lower surface of the touch pad 100 while the downward external force is not applied to the touch pad 100, the supporting part 330 should be compressed or bent, when the downward external force is applied and the touch pad 100 is moved down. However, if the supporting part 330 is configured to be too easily compressed or bent, the touch pad 100 may be inclined to one side, when the downward external force is applied. If the supporting part 330 is configured not to be easily compressed or bent, a great force is required to press down the pushing terminal.

Therefore, the touch pad input device according to the present invention may be configured so that, when the downward external force is applied to the touch pad 100, the touch pad 100 is easily moved down (until the pushing terminal is pushed), and then the touch pad 100 is not easily moved down any more. That is, the restoring means 300 is configured so that the upper surface of the supporting part 330 is disposed to be lower than the upper surface of the seating part 310, and while the downward external force is not applied, the touch pad 100 is seated on the seating part 310, and when the downward external force is applied, the touch pad 100 is easily moved down, until the lower surface of the touch pad 100 is in contact with the upper surface of the supporting part 330, and then after the lower surface of the touch pad 100 is in contact with the upper surface of the supporting part 330, the touch pad 100 is not easily moved down. Like this, in the case in which the upper surface of the supporting part 330 is manufactured to be lower than the upper surface of the seating part 310, even though the supporting part 330 does not have the elasticity, the touch pad 100 may be moved down by the downward external force so as to push the pushing terminal 210, and when the downward external force is released, the touch pad 100 may be returned upward to its original status by the elasticity of the seating part 310. However, in the case in which the supporting part 330 is formed of a rigid body having no elasticity, when the touch pad 100 is pressed down, the touch pad 100 may collide with the supporting part 330 and thus may be damaged, and thus it is preferable that the supporting part 330 be manufactured of an elastic material such as silicone.

Also, the supporting part 330 and the seating part 310 may be connected with each other by a relatively thin elastic piece 350 so that the touch pad 100 is easily moved down, until the lower surface of the touch pad 100 is in contact with the upper surface of the supporting part 330. Further, the elastic piece 350 is disposed to be inclined, such that a portion of the elastic piece 350 connected with the supporting part 330 is lower than a portion thereof connected with the seating part 310, and thus the touch pad 100 is stably returned (i.e., the touch pad 100 is easily moved up), when the downward external force applied to the touch pad 100 is released. Like this, in the case in which the elastic piece 350 is disposed to be inclined, when the touch pad 100 is moved down, the elastic piece 350 is compressed, and thus when the applied external force is released, the touch pad 100 may be easily moved up by a compression elastic force of the elastic piece 350. Of course, the elastic piece 350 may be disposed to be inclined in an opposite direction, such that the elastic piece 350 is stretched when the touch pad 100 is moved down, and the touch pad 100 is moved up by a stretched elastic force of the elastic piece 350 when the applied external force is released. However, when an elastic body is repeatedly stretched, the restoring force is remarkably reduced. Therefore, as described in the embodiment, the elastic piece 350 is preferably configured to be compressed when the touch pad 100 is moved down.

Figure 7:
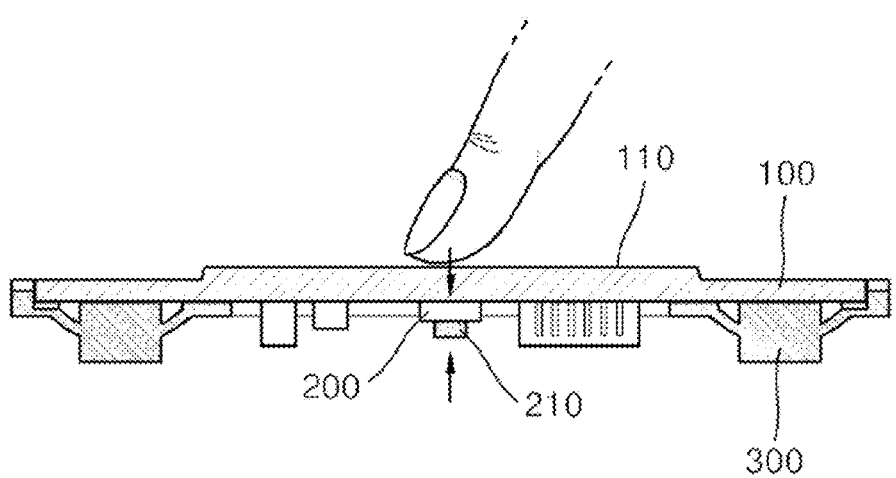
FIGS. 7 to 9 are cross-sectional views illustrating an operating state of a switch according to positions at which the touch pad is pressed down.
Figure 8:
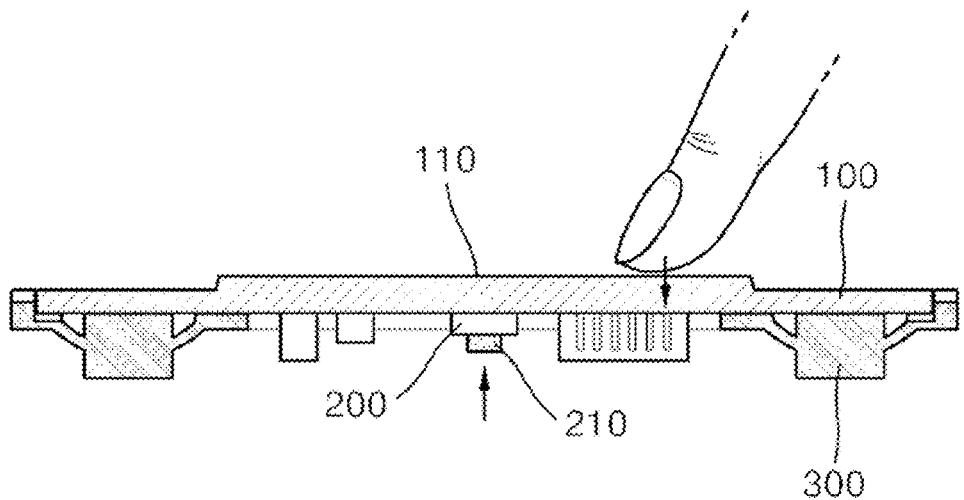
Figure 9:
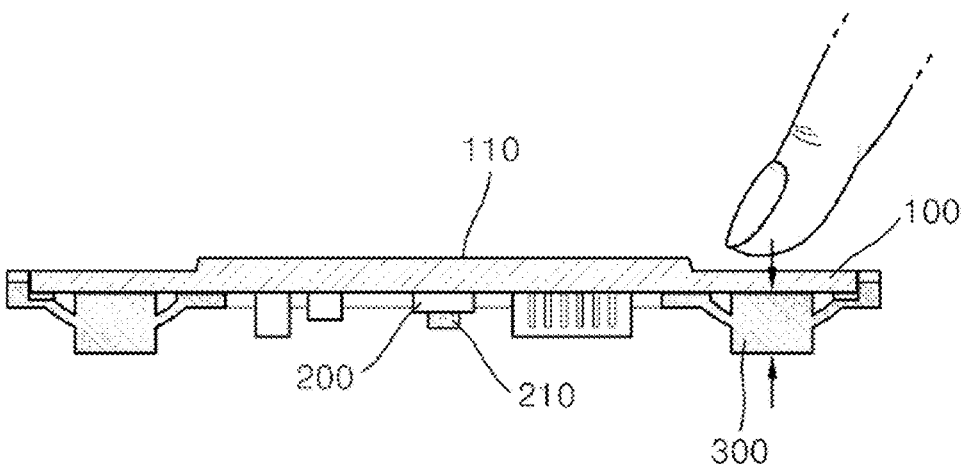

FIGS. 7 to 9 are cross-sectional views illustrating an operating state of the switch according to positions at which the touch pad 100 is pressed down.

As illustrated in FIG. 7, when the user pushes a center portion of the touch area 110, i.e., a portion in which the switch is installed, a user's force is directly transmitted to the switch, and thus the pushing terminal of the switch is stably pushed.

Meanwhile, as illustrated in FIG. 8, when the user pushes an edge of the touch area 110, i.e., a portion between a portion in which the switch is installed and a portion in which the supporting part 330 is installed, the user's force is dispersed and applied to the switch and the supporting part 330, and used to compress the supporting part 330 and to push the pushing terminal. At this time, when an installation position of the supporting part 330 is disposed to be closer to the switch than the portion of the touch pad 100 pressed down by the user, the touch pad 100 may be inclined when the user presses down the touch pad 100, and thus the pushing terminal may not be normally pushed. Therefore, the touch pad input device according to the present invention may be configured so that the touch pad 100 has the touch area 110 formed at the center portion of the upper surface thereof, and the supporting part 330 supports a portion of the lower surface of the touch pad 100 which is located at an outer side than a position thereof corresponding to the touch area 110, and thus the touch pad 100 is not inclined, even though the user presses any portion of the touch area 110. In this case, even though the user presses any portion of the touch area 110, the downward external force is applied between the switch and the supporting part 330, and thus the touch pad 100 may be prevented from being inclined to one side.

In general, the touch pad 100 may be formed in a quadrangular plate shape, and the touch area 110 may be formed in a circular shape, and the supporting part 330 may be arranged to support a portion of the lower surface of the touch pad 100, which is deviated from the touch area 110, i.e., each corner portion of the touch pad 100. Of course, an arrangement structure of the supporting part 330 may be changed variously according to a shape of the touch pad 100 and a shape of the touch area 110.

Figure 10:
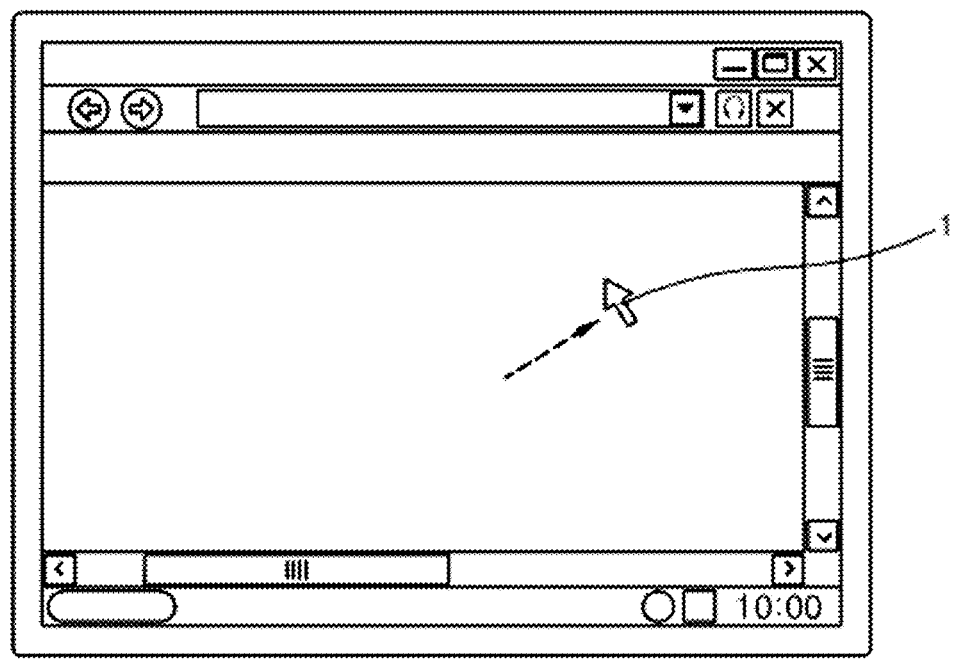
FIGS. 10 to 12 are views illustrating a state in which a pointer sequential movement is realized using the touch pad input device according to the present invention.
Figure 10:
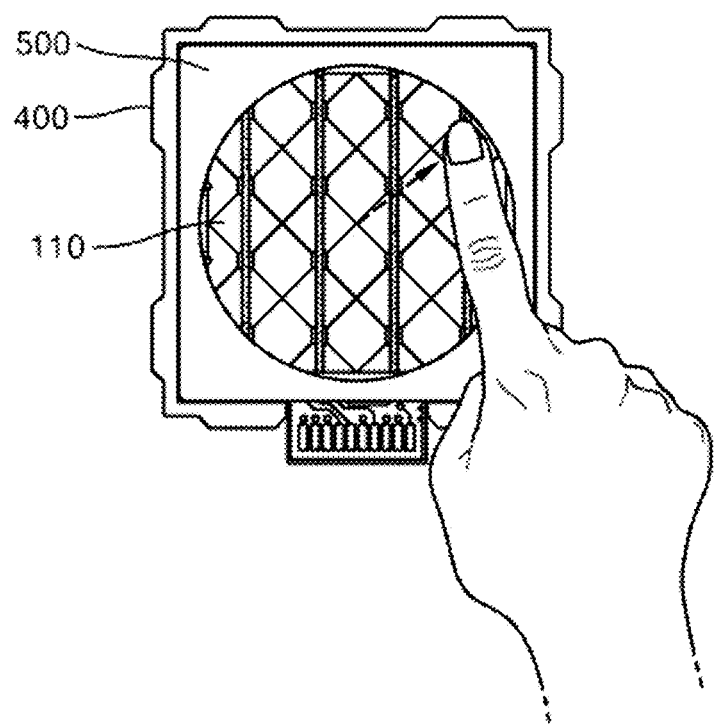
Figure 11:
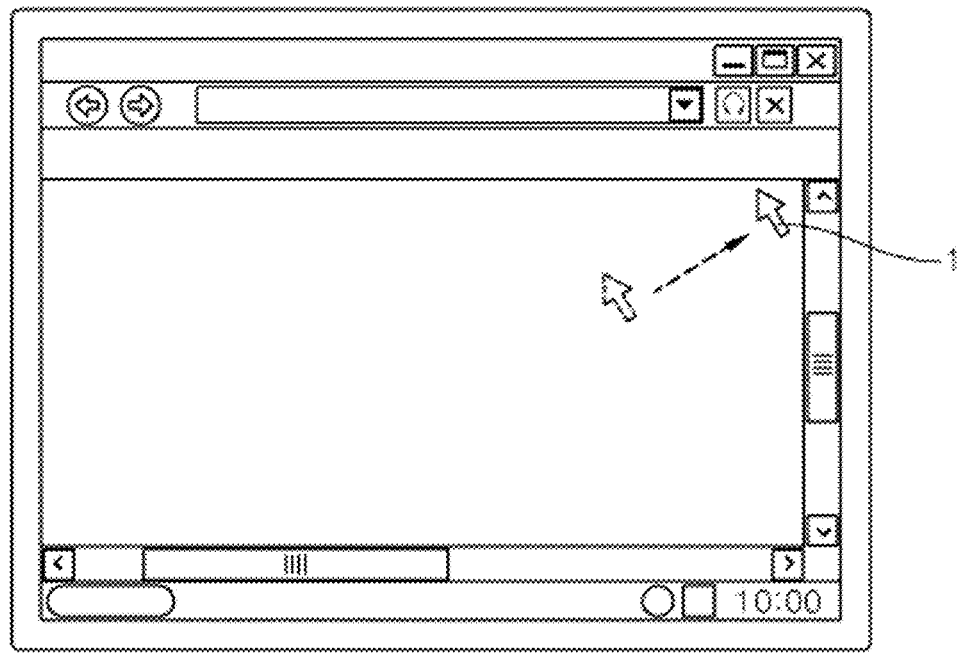
Figure 11:
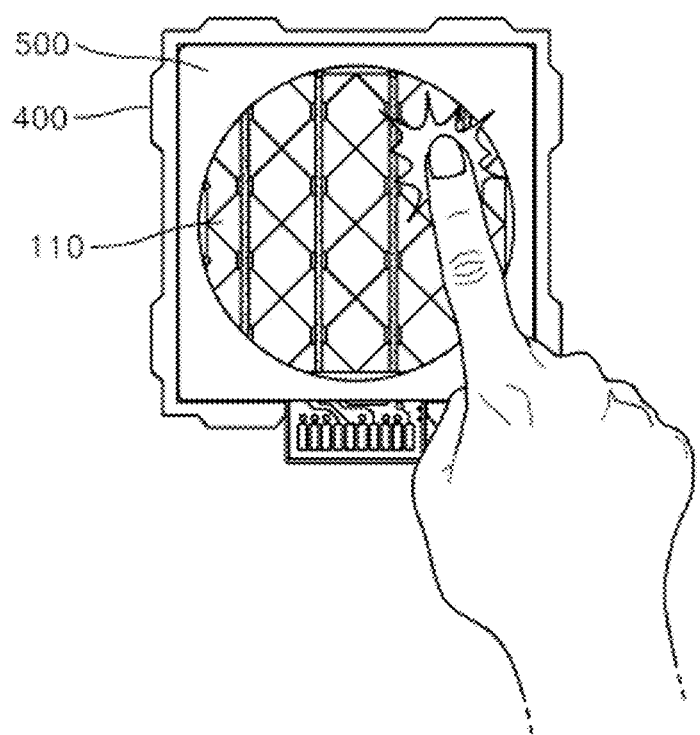
Figure 12:
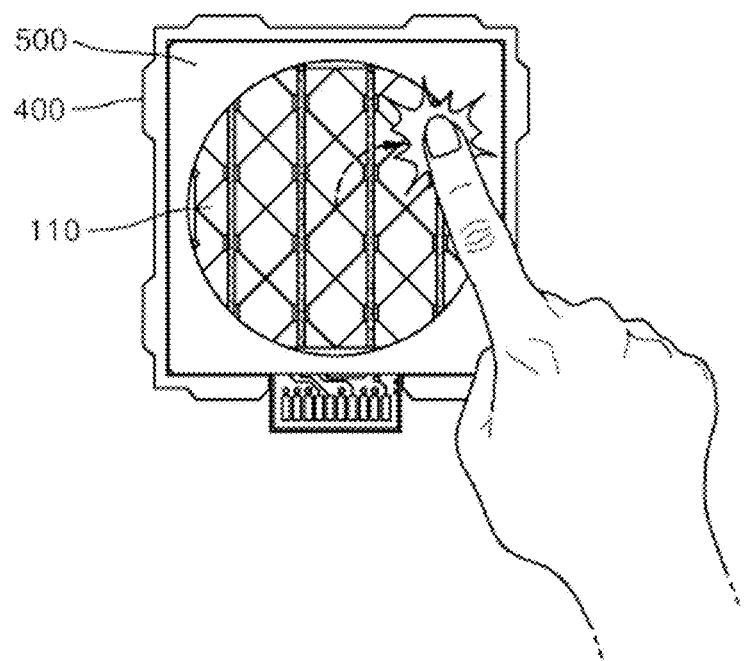

FIGS. 10 to 12 are views illustrating a state in which a pointer sequential movement is realized using the touch pad input device according to the present invention.

As illustrated in FIG. 10, when a pointer 1 is moved using the touch pad input device according to the present invention, a drag operation is performed on the touch area 110 of the touch pad 100 in a desirable direction. A technique in which the pointer 1 is moved through the drag operation on the touch pad 100 is already used widely, and thus detailed description thereof will be omitted.

At this time, the touch pad input device according to the present invention is characterized in that, when a pressure more than a reference value is applied to the touch pad 100 and the switch is turned on, while a drag signal is applied to the touch area 110 and the pointer 1 is moved, a movement signal of the pointer 1 is continuously generated, even though the drag signal is not applied any more. Like this, when the touch pad input device is configured so that the pointer 1 is continuously moved, when the switch is pushed during the drag operation, it is not necessary that the drag operation is repeatedly performed a few times in one direction so as to move the pointer 1 to a long distance, and thus it is very convenient to use the touch pad input device.

A moving direction of the pointer 1 as the switch is turned on may be set to a direction directed from the center portion of the touch pad 100 toward an applying position of the pressure for turning on the switch, a direction directed from a position in which the touch pad 100 is initially touched toward the applying position of the pressure for turning on the switch, or a drag direction just before the pressure is applied so as to turn on the switch. That is, as illustrated in FIG. 12, when the touch pad 100 is pushed to turn on the switch, while the drag operation is performed along a circular arc of 90 degrees from the center portion of the touch area 110, it may be configured so that the pointer 1 is continuously moved in a direction directed from the center portion of the touch area 110 toward the applying position of the pressure for turning on the switch, i.e., in a 2 and a half o'clock direction, or the pointer 1 is continuously moved in a drag direction just before the pressure is applied so as to turn on the switch, i.e., in a right direction. Meanwhile, in FIG. 12, a position in which the touch pad 100 is initially touched is the center portion of the touch area 110, and thus even when the moving direction of the pointer 1 is set to the direction directed from the position in which the touch pad 100 is initially touched toward the applying position of the pressure for turning on the switch, the pointer 1 is continuously moved in the 2 and a half o'clock direction.

Also, when a certain icon 2 or item is executed, the touch pad 100 is also pressed down so as to turn on the switch. In this case, when the switch is turned on during the drag operation, it may be confused about whether to execute the certain icon 2 or item, or to continuously move the pointer 1. Therefore, in the touch pad input device according to the present invention, when the pressure is applied so as to turn on the switch, and the applied pressure is released within a predetermined period of time, an execution signal is generated, and when a state in which the pressure is applied so as to turn on the switch exceeds the predetermined period of time, a pointer moving signal is generated.

Figure 13:
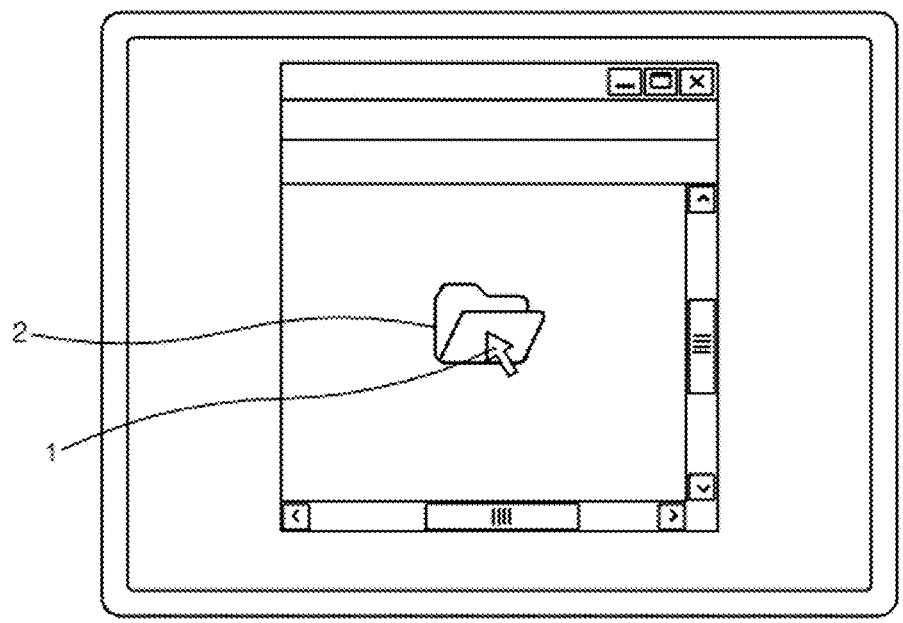
FIGS. 13 and 14 are views illustrating a state in which drag and drop functions is realized using the touch pad input device according to the present invention.
Figure 13:
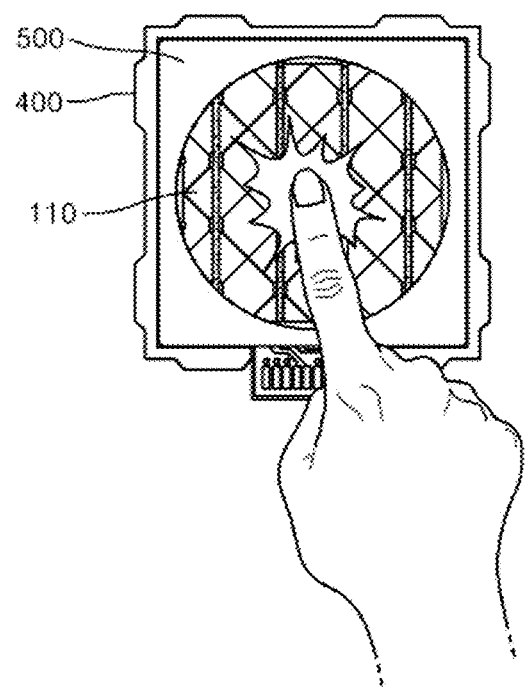
Figure 14:
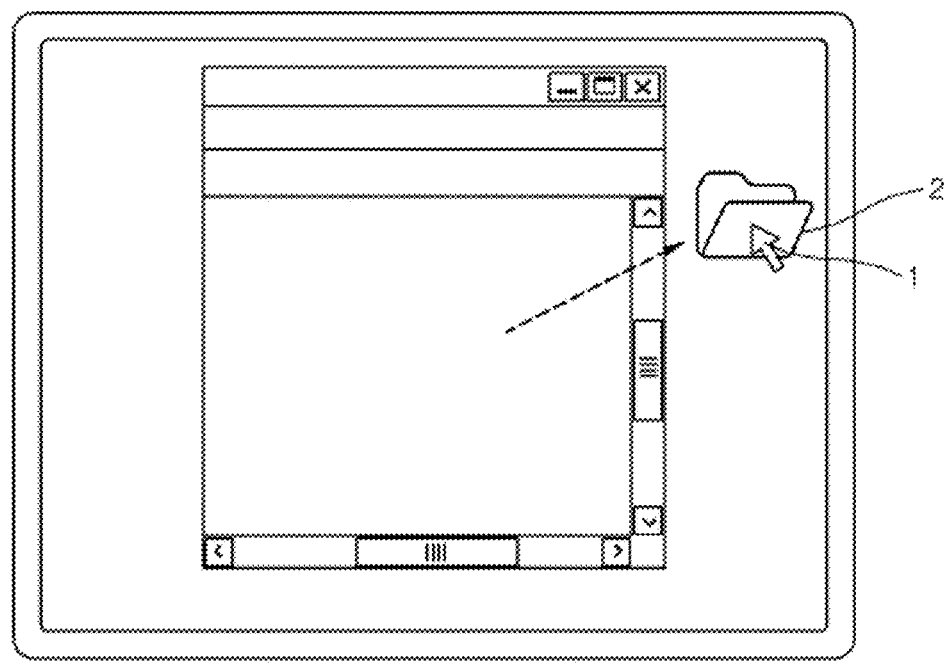
Figure 14:
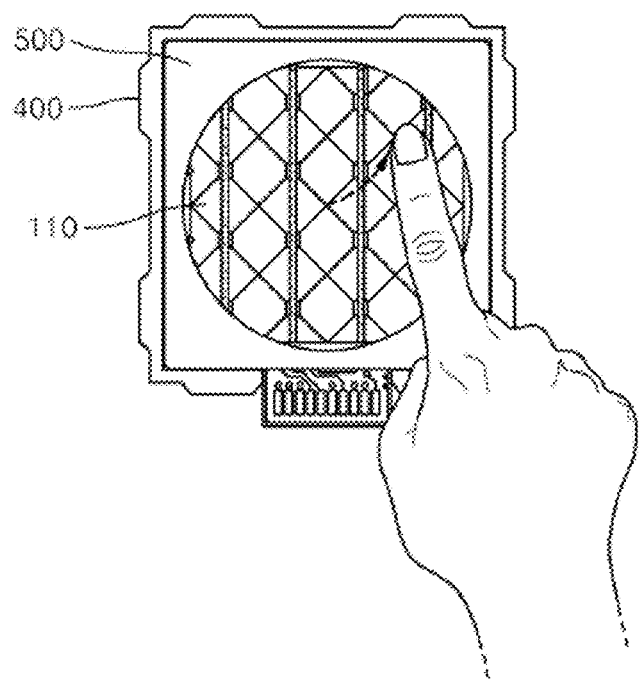

FIGS. 13 and 14 are views illustrating a state in which drag and drop functions is realized using the touch pad input device according to the present invention.

The touch pad input device according to the present invention may be configured so that the drag and drop functions is performed, while a click feeling which is the same as that when a mouse is used is provided. That is, in the touch pad input device according to the present invention, as illustrated in FIG. 13, when the pressure more than a reference value is applied to the touch pad 100, and the switch is turned on, the corresponding icon 2 is selected, and then while the pressure applied to the touch pad 100 is reduced to be less than the reference value and the switch is turned off but the touch state is maintained, when the drag signal is input, a function of moving the selected icon 2, i.e., a drag function of the drag and drop functions may be realized, as illustrated in FIG. 14. Also, in a state illustrated in FIG. 14, when the touch pad 100 is pressed down once again to turn on the switch, the dragged icon 2 may be dropped.

Also, as illustrated in FIG. 14, while the icon 2 is moved, when the user's finger is located at an edge of the touch pad 100, the icon 2 may not be moved any more. When it is intended to further move the icon 2, it is inconvenient to separate the finger from the touch pad 100 and then to repeat an icon selecting process illustrated in FIG. 13 and an icon moving process illustrated in FIG. 14. To solve the problem, the touch pad input device according to the present invention may be configured so that, when the touch pad 100 is pressed down once again in the state illustrated in FIG. 14 and the switch is turned on, the icon 2 is continuously moved in a certain direction without an additional drag operation.

Also, when the touch pad 100 is pressed down once again in the state illustrated in FIG. 14 and the switch is turned on, the pointer 1 may be continuously moved, even though the drag operation is not performed any more, and also a moving speed of the pointer 1 may be changed, i.e., the pointer 1 may be moved faster or slower. A kind of the signal generated when the icon 2 is being moved and the touch pad 100 is pressed down to turn on the switch may be set variously according to the user's convenience.

Further, the touch pad input device according to the present invention may be configured so that a function of releasing an icon selection while the drag function of the drag and drop functions is performed, i.e., a drop function of the drag and drop functions is realized. For example, when a contact means (the user's finger in the embodiment) which is performing the drag function is separated from the touch pad 100, the drop function may be performed, or when the contact means which is performing the drag function is separated from the touch pad 100 and then tapped once or more times on the touch pad 100, the drop function may be performed. Alternatively, when the contact means which is performing the drag function is separated from the touch pad 100 and then pressed on the touch pad 100, and thus the switch is turned on once or more times, the drop function may be performed.

Further, the touch pad input device according to the present invention may be configured so that the drag function of the drag and drop functions is performed in an operation pattern similar to that when a general mouse is used. That is, when the drag function is performed while the pressure more than the reference value is applied to the touch pad and the switch is in the ON state, the drag function of the drag and drop functions may be performed. In the case in which the drag function is performed while the switch is in the ON state, the drag function may not be performed when the pressure applied to the touch pad is reduced to be less than the reference value and the switch is turned off and then the pressure more than the reference value is applied again to turn on the switch, and the pointer may be continuously moved, even though the touch means is stopped. Also, when the pressure applied to the touch pad is reduced to be less than the reference value and to turn off the switch, and then the pressure more than the reference value is applied again to turn on the switch, the pointer moving speed may be changed.

As described above, in the case in which the drag and drop functions is performed by combining an operation of performing the drag function on the touch pad 100 and an operation of pushing the switch 200, the click feeling may be provided upon an operation of selecting or dropping the icon 2, and thus the user's convenience may be further enhanced. Also, various functions which are not realized when the drag and drop functions is performed using the general mouse may be realized.

Figure 15:
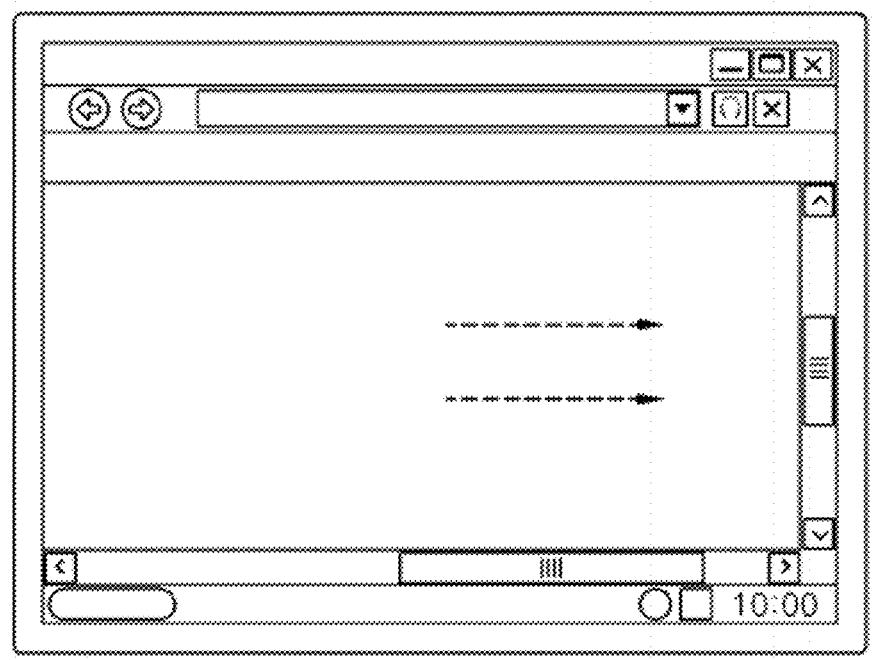
FIGS. 15 and 16 are views illustrating a state in which a screen scroll function is realized using the touch pad input device according to the present invention.
Figure 15:
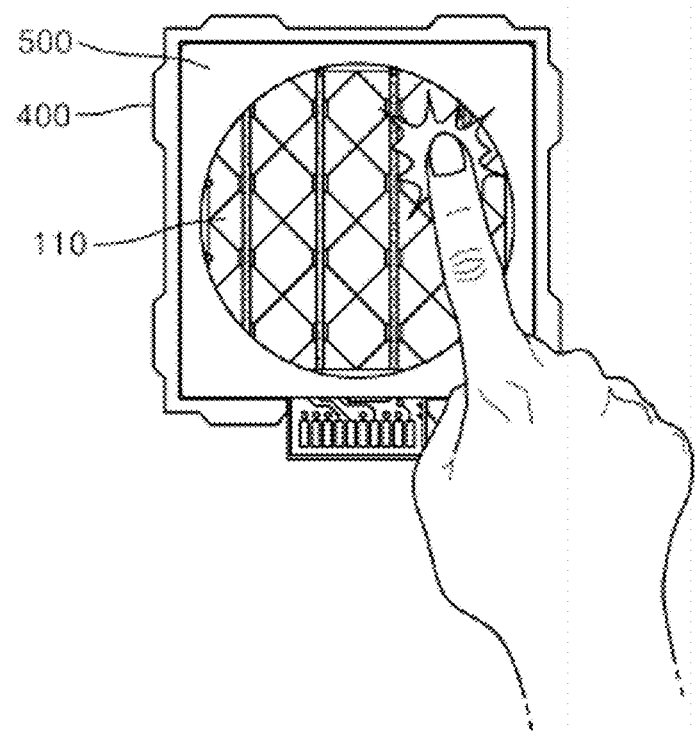
Figure 16:
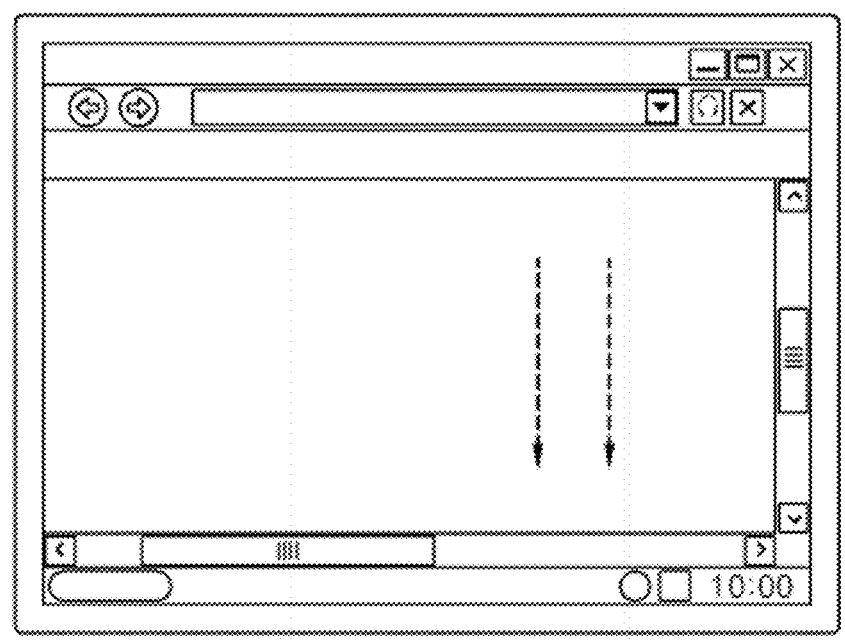
Figure 16:
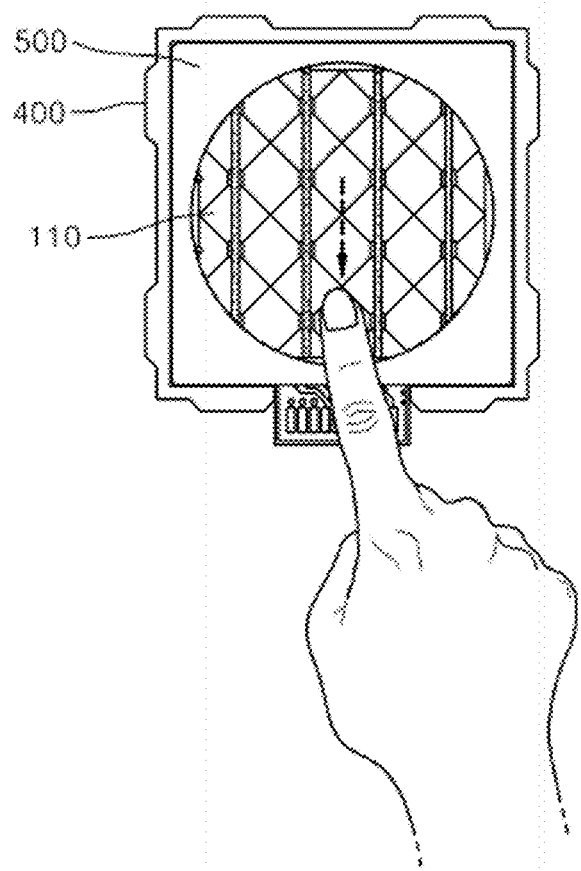

FIGS. 15 and 16 are views illustrating a state in which a screen scroll function is realized using the touch pad input device according to the present invention.

The touch pad input device according to the present invention may be configured so as to be converted into a scroll signal input mode, when the pressure (the pressure by which the switch is not turned on) less than the reference value is continuously applied once or predetermined times or more. That is, as illustrated in FIG. 15, when a right side of the touch area 110 is tapped, a scroll function may be performed toward a right side by a predetermined distance. Also, when the drag function is performed in the scroll mode, the scroll function may be performed in a drag direction, as illustrated in FIG. 16. At this time, an operation method in which the scroll function is performed through the drag operation is already used in a notebook or the like, and detailed description thereof will be omitted.

Also, the touch pad input device according to the present invention may be configured so that the scroll function is performed when the drag operation is performed in a scroll mode in an arc direction. For example, when an arc-shaped drag operation is performed in a clockwise direction, the screen may be scrolled downward, and when the arc-shaped drag operation is performed in a counterclockwise direction, the screen may be scrolled upward. Of course, when the drag operation is performed in the clockwise and counterclockwise directions, the screen may be scrolled left and right. As described above, when the touch pad input device according to the present invention is configured so that the scroll function is performed through the arc directional drag operation, the user may repeat a few times a circular-shaped drag operation while the finger is not separated from the touch pad 100, and thus the scroll function may be continuously performed.

Figure 17:
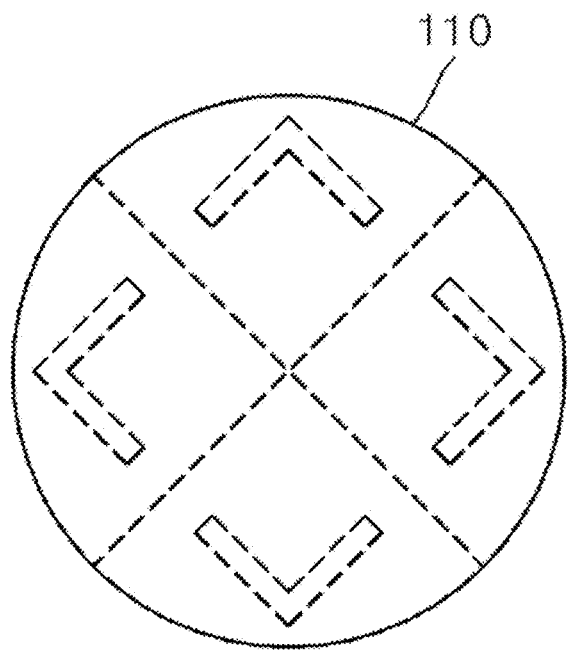
FIGS. 17 and 18 are views illustrating a state in which a touch area is divided into a plurality of partial areas so that the touch pad input device according to the present invention performs a function of an arrow key.
Figure 18:
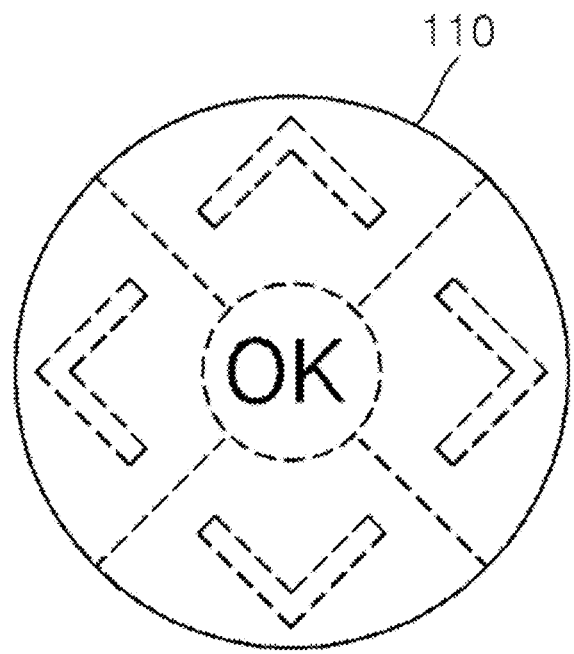

FIGS. 17 and 18 are views illustrating a state in which the touch area 110 is divided into a plurality of partial areas so that the touch pad input device according to the present invention performs a function of an arrow key.

The touch pad input device according to the present invention may be configured so that the touch pad 100 is used as the arrow key. That is, when the pressure less than the reference value is continuously applied once or predetermined times or more on the touch pad 100, the touch pad 100 may be converted into the arrow key signal input mode, and thus an up and down and left and right moving signal may be generated according to a portion of the touch area 110 touched by the user.

For example, as illustrated in FIG. 17, the touch area 110 of the touch pad 100 may be divided into four partial areas, and arrow key input signals having different directions may be generated according to a portion of the four partial areas touched by the user. Also, other than the above-described four partial areas, another partial area may be provided at a center portion of the touch pad 100, and thus the touch area 110 may be divided into five partial areas, as illustrated in FIG. 18. And, when up and down and left and right partial areas are touched, the arrow key input signal may be generated, and when the center area is touched, a selection signal may be generated. Also, when a touch signal is applied in the arrow key signal input mode, an arrow key signal may be input, and when a drag signal is applied, a scroll signal may be input. As described above, when the touch area 110 is divided into the plurality of partial areas, the user may use the touch area 110 as the arrow key and a wheel key, and thus operational convenience may be enhanced.

Also, in the case in which the touch area 110 is divided into the plurality of partial areas, when the touch area 110 is pressed down to turn on the switch 200, different kinds of signals may be generated according to a touched portion of the touch area 110. For example, when the switch 200 is turned on by pushing the left partial area, a signal which is the same as a left click signal of the mouse may be generated, and when the switch 200 is turned on by pushing the right partial area, a signal which is the same as a right click signal of the mouse may be generated. Therefore, the touch pad input device according to the present invention may be operated with an operation feeling similar to that of the mouse. At this time, the touch area 110 may be configured so that a pressure applying area for generating the left and right click signals of the mouse is indicated separately.

Meanwhile, in the arrow key signal input mode, it may be possible to be converted into an initial state, i.e., the pointer moving signal input mode by operating the touch pad 100 in a particular pattern. For example, as illustrated in FIGS. 17 and 18, in the case in which the touch area 110 of the touch pad 100 is divided into four or more partial areas, when the drag signal is applied in the arrow key signal input mode so as to pass through three or more partial areas, the arrow key signal input mode may be ended, and then it may be possible to be returned to the pointer moving signal input mode. As described above, when the touch area 110 is divided into the plurality of partial areas, a pattern of operating the touch area 110 may be divided into various kinds, and different signals may be assigned according to the kinds of the patterns, and thus various kinds of signals may be input with one touch pad 100.

Also, in general, to continuously input the arrow key signal, the touch pad 100 (more specifically, the touch area 110) is repeatedly tapped a few times. The touch pad input device according to the present invention may be configured so that, when the touch pad 100 is simply touched for a predetermined period of time (with the pressure less than the reference value so as to maintain the switch 200 in the OFF state), the arrow key signal may be continuously generated. At this time, when the pressure (hereinafter, called as "tapping") less than the reference value is continuously applied twice or more to the touch pad so as to be converted into the arrow key signal input mode, a generating speed, i.e., an input speed of the arrow key signal may be changed according to a tapping speed. For example, in the case in which the tapping should be performed twice to be converted into the arrow key signal input mode, when the twice tapping speed is fast, it may be set so that an input period of the arrow key signal becomes short, while the touch pad 100 is simply touched for the predetermined period of time, i.e., it may be set so that the arrow key signal is rapidly input, and when the twice tapping speed is slow, it may be set so that the input period of the arrow key signal becomes long, while the touch pad 10 is simply touched for the predetermined period of time, i.e., it may be set so that the arrow key signal is slowly input.

Furthermore, when the touch pad 100 is pressed with the pressure more than the reference value to convert the switch 200 into the ON state, and then the touch state is maintained for a predetermined period of time, the signal generating speed may be changed. That is, when a high pressure is applied so as to turn on the switch 200, and then the contact state is maintained for a long period of time, it may be set so that the arrow key signal is rapidly generated, and thus the larger number of arrow key signals may be generated within a short period of time.

Also, the touch pad input device according to the present invention may be configured so that the arrow key signal input mode illustrated in FIGS. 17 and 18 is converted into the scroll signal input mode. At this time, when the pressure more than the reference value is continuously applied predetermined times or more to the touch pad 100, it may be converted into the scroll signal input mode, and when the pressure more than the reference value is continuously applied for the predetermined period of time or more to the touch pad 100, it may be converted into the scroll signal input mode. As described above, in the touch pad input device according to the present invention, since various kinds of signals may be generated by appropriately combining the touch number or the touch period of time, various signals may be input without additional buttons.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A touch pad input device comprising:
a housing comprising a base, sidewalls extending upwardly from the base and a top opening;
a touch pad arranged in the top opening and comprising an upper surface and a lower surface, the upper surface comprising a touch area;
a switch interposed between the touch pad and the base, wherein between the touch pad and the base of the touch pad input device there is no additional switch for generating such a switching signal in response to a downward external pressure; and
a restoring means placed between the touch pad and the base, the restoring means comprising a frame, a plurality of supports, and a plurality of elastic connectors,
wherein each support contacts and is supported by the base, each elastic connector elastically connects between one of the plurality of supports and the frame, and the frame contacts and supports a perimeter of the touch pad
such that the frame and the touch pad are elastically supported upward by the restoring means, and
such that, in response to the downward external pressure applied to the touch area of the touch pad, the elastic connection deforms to allow downward movement of the touch pad, which causes pressing of the switch for generating the switching signal.

2. The touch pad input device of claim 1, wherein the switch is attached to a central portion of the touch pad and the plurality of supports are located around the switch when viewed in a downward direction.

3. The touch pad input device of claim 1, wherein the plurality of supports are radially distanced from the switch when viewed in a downward direction.

4. The touch pad input device of claim 1, wherein the touch pad has a lower surface facing away from the upper surface, wherein the elastic connector is configured to elastically deform to allow the touch pad to move downward until the lower surface contacts and is supported by one of the plurality of supports.

5. The touch pad input device of claim 1, wherein the frame comprises a central opening for circuit components attached to the touch pad.

6. The touch pad input device of claim 1, wherein the frame comprises a seat and sidewalls extending upwardly from the seat.

7. The touch pad input device of claim 1, further comprising an electric connector horizontally extending from the touch pad and configured to electrically connect to a counterpart device or circuit for sending electrical signals to the counterpart device or circuit.

8. The touch pad input device of claim 1, wherein, when the downward external pressure more than a reference value is applied to the touch pad so as to turn on the switch, and the pressure applied to the touch pad is reduced to be less than the reference value and thus to turn off the switch, and then a drag operation is performed while a touched state is maintained, a drag function of drag and drop functions is realized.

9. The touch pad input device of claim 8, wherein, while the drag function of the drag and drop functions is realized, when the pressure more than the reference value is applied again to the touch pad and thus the switch is turned on, a pointer is continuously moved, even though the drag operation is not performed, or a pointer moving speed is changed.

10. The touch pad input device of claim 8, wherein, while the drag function of the drag and drop functions is realized, when a contact means which is performing the drag operation is separated from the touch pad, or when the contact means which is performing the drag operation is separated from the touch pad and then tapped once or more times on the touch pad, or when the contact means which is performing the drag function is separated from the touch pad and then pressed on the touch pad, and the switch is turned on once or more times, a drop function of the drag and drop functions is realized.

11. The touch pad input device of claim 1, wherein, when the downward external pressure more than a reference value is applied to the touch pad, the switch is configured to be turned on and the device is configured to continuously generate a pointer moving signal,
wherein a pointer is moved from the center portion of the touch pad toward a position in which the pressure is applied so as to turn on the switch.

12. The touch pad input device of claim 11, wherein the pointer is moved from a position in which the touch pad is initially touched toward a position in which the pressure is applied so as to turn on the switch.

13. The touch pad input device of claim 1, wherein, when the downward external pressure less than the reference value is continuously applied once or predetermined times or more to the touch pad, the touch pad input device is converted into a scroll signal input mode.

14. The touch pad input device of claim 1, wherein, when the downward external pressure less than a reference value is continuously applied once or predetermined times or more to the touch pad, the touch pad input device is converted into an arrow key signal input mode.

15. The touch pad input device of claim 14, wherein the touch area of the touch pad is divided into four partial areas so as to generate an arrow key input signal, or divided into five or more partial areas so as to generate the arrow key input signals of four areas and a selection signal of one area.

16. The touch pad input device of claim 14, wherein, while the switch is turned off, when the touch pad is touched for a predetermined period of time, an arrow key signal is continuously generated.

17. The touch pad input device of claim 1, wherein, when the downward external pressure more than a reference value is continuously applied predetermined times or more to the touch pad or when the downward external pressure more than the reference value is applied for a predetermined period of time or more to the touch pad, the touch pad input device is converted into a scroll signal input mode.

* * * * *